Aug. 18, 1931.  H. M. WHITAKER ET AL  1,819,935
FERTILIZER DISTRIBUTOR
Filed July 26, 1928   2 Sheets-Sheet 1

H. M. WHITAKER
M. D. OVERSTREET
Inventors

By CASnow&Co.
Attorneys.

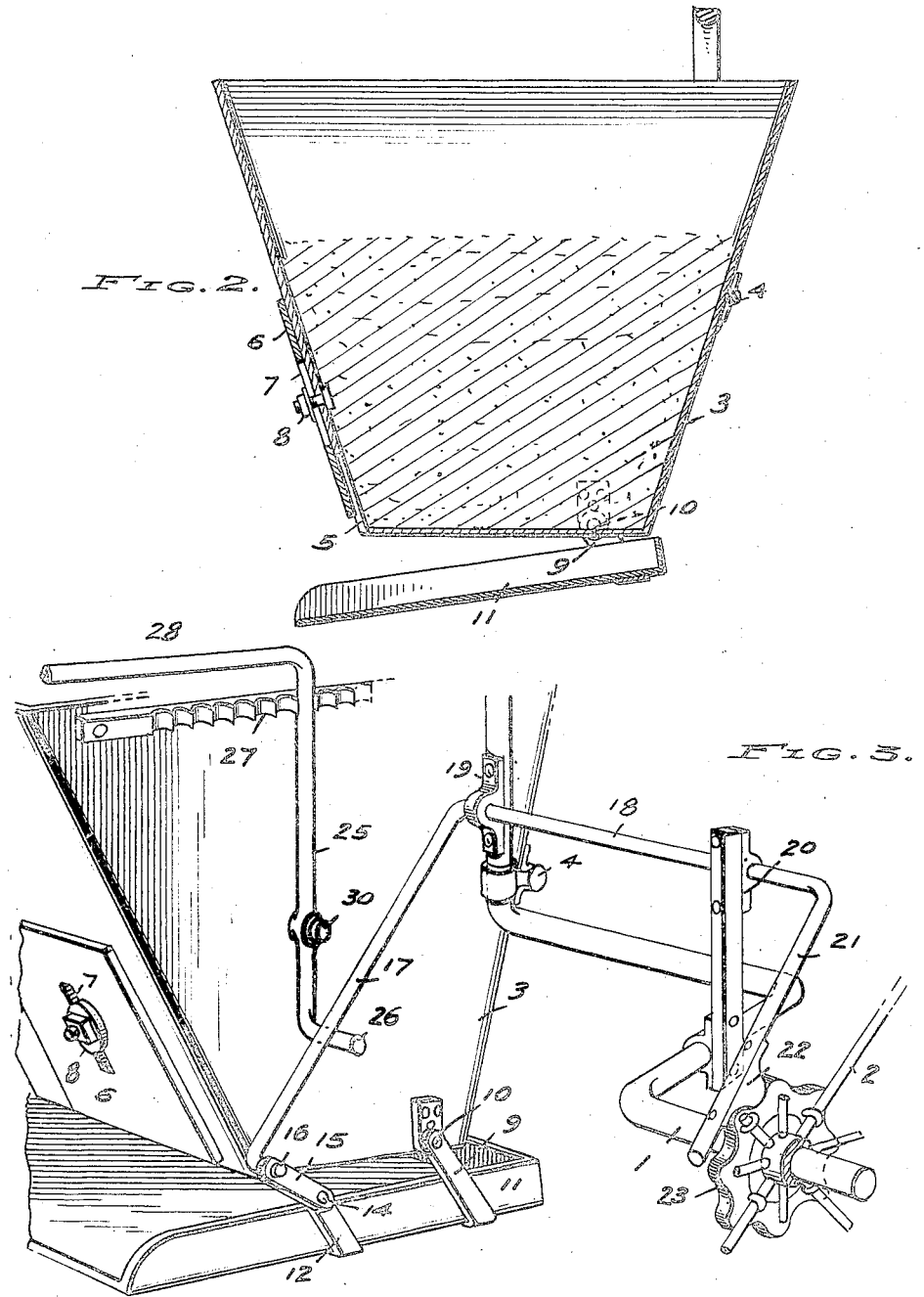

Patented Aug. 18, 1931

1,819,935

UNITED STATES PATENT OFFICE

HUBERT M. WHITAKER AND MALCOLM D. OVERSTREET, OF ENFIELD, NORTH CAROLINA

FERTILIZER DISTRIBUTOR

Application filed July 26, 1928. Serial No. 295,392.

This invention aims to provide a simple means whereby guano, or other fertilizer, or any similar material may be applied quickly and rapidly to the surface of the soil, the device described being capable of mounting on agricultural machines of various kinds, such as cultivators.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:—

Figure 2 is a vertical section taken through the hopper and attendant parts;

Figure 3 is a perspective view of the device forming the subject matter of this application.

Figure 1:
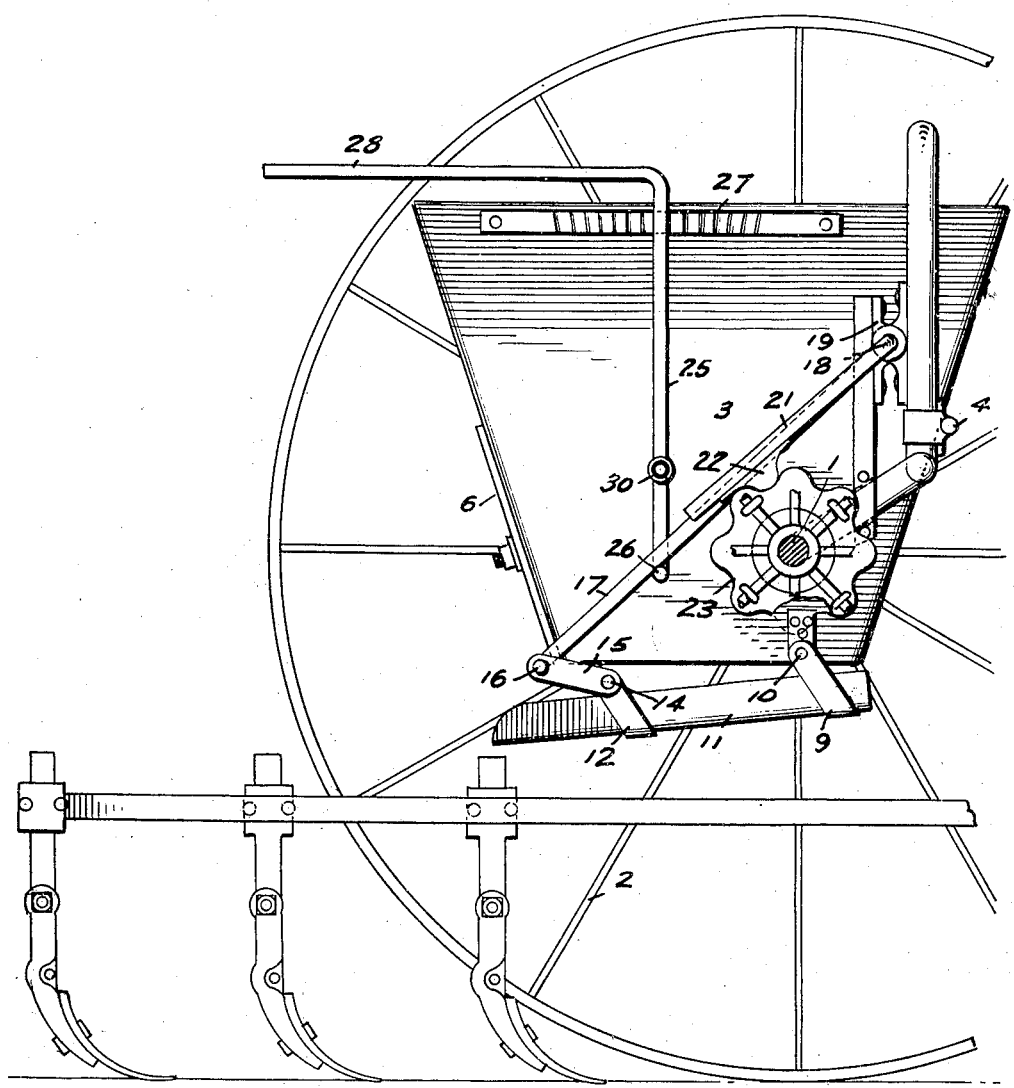
Figure 1 shows in side elevation, a portion of a cultivator equipped with a device constructed in accordance with the invention.

In the drawings, the numeral 1 marks the axle of a cultivator or similar agricultural machine, the ground wheels 2 being journaled for rotation on the axle 1. The numeral 3 designates a hopper which is secured, as shown at 4, in any suitable way, to the axle 1. The hopper 3 has an outlet 5, the effective size of which may be controlled by a vertically adjustable gate 6 which is slidable on the hopper 3, the gate 6 having an elongated slot in which is mounted a bolt or other securing element carried by the wall of the hopper 3. The numeral 9 marks a U-shaped hanger, the upwardly extended ends of which are pivotally mounted, as shown at 10, on the sides of the hopper 3.

In the hangar 9 is secured a shaker pan 11 which is disposed below the outlet 5 of the hopper 3. The numeral 12 designates a hanger extended beneath and secured to the shaker pan 11. The hanger 12 is pivoted at 14 to a link 15. The upper end of the link 15 is pivoted at 16 to one arm 17 of a shaft 18 which is mounted to rock in bearings 19 and 20 carried by the axle 1. At its outer end, the shaft 18 has a finger 21 disposed approximately parallel to the arm 17 and provided with a projection 22 adapted to cooperate with a toothed knocker wheel 23, secured to one of the ground wheels 2.

A means is provided for limiting the movement of the shaker pan 11. With this consideration in mind, a resilient lever 24 is fulcrumed intermediate its ends as shown at 30 on the side wall of the hopper 3. At its upper ends, the lever 25 has a handle 28. Owing to the fact that the lever 25 is resilient, it can be engaged with the notches of a rack 27 secured to the side of the hopper 3. At its lower end, the lever 25 is provided with a projection or stop 26 which extends under the arm 17 of the shaft 18.

In practical operation, the ground wheel 2 is rotated, rotation being imparted to the knocker wheel 23. The knocker wheel 23, cooperating with the projection 22 on the finger 21, will impart rocking movement to the shaft 18 in the bearings 19 and 20. The arm 17 will be caused to swing up and down, and the link will cause the shaker pan 11 to swing up and down on its pivotal mounting 10. The material which flows out of the outlet 5 in the hopper 3, under the governance of the adjustable gate 6, will be received within the shaker pan 11, and will be distributed upon the soil, in a way which will be understood readily by any person examining the drawings in connection with the foregoing description.

It is possible to swing the lever 25 on its fulcrum 30 and to engage the lever with the rack 27. In this way, the position of the projection or stop 26 on the lever 25, with respect to the arm 17 may be adjusted, and the vertical throw of the shaker pan 11 can be regulated accordingly, so that more or less material will be shifted out of the pan upon the ground.

What is claimed is:

1. In a device of the class described, a hopper, a shaker pan disposed beneath the hopper, a knocker wheel supported for rotation, means for rotating the knocker wheel, a shaft, means for supporting the shaft for rocking movement about a fixed longitudinal axis, the shaft having transverse arms which swing with said axis as a center of swinging movement, one of said arms lying in the path of the knocker wheel, and means for connecting the other arm of the shaft to the pan.

2. In a device of the class described, a hopper, a shaker pan disposed beneath the hopper, a knocker wheel supported for rotation, means for rotating the knocker wheel, a shaft supported for rocking movement and having arms, one arm lying in the path of the knocker wheel, means for connecting the other arm of the shaft to the pan, a lever fulcrumed intermediate its ends, a stop on one end of the lever and cooperating with the last-specified arm of the shaft to limit the movement of the pan, and a rack wherewith the opposite end of the lever cooperates to regulate the position of the stop.

3. In a device of the class described, a hopper, a shaker pan disposed beneath the hopper, a knocker wheel supported for rotation, means for rotating the knocker wheel, a shaft, means for supporting the shaft for rocking movement about a fixed longitudinal axis, the shaft having transverse arms which swing with said axis as a center of swinging movement, one of said arms lying in the path of the knocker wheel, and means whereby the shaker pan is actuated by the other arm.

In testimony that we claim the foregoing as our own, we have hereto affixed our signatures.

HUBERT M. WHITAKER.
MALCOLM D. OVERSTREET.